March 26, 1929.                J. P. WHANN                1,707,182
                            LIFE SAVING DEVICE
                    Filed Jan. 15, 1925        2 Sheets-Sheet 1
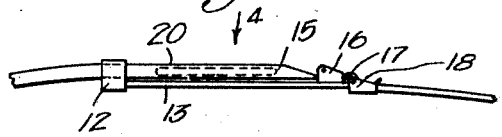
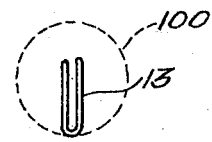
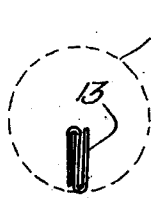
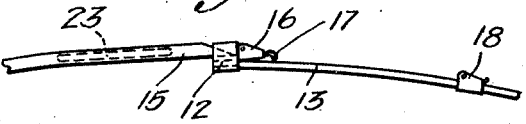
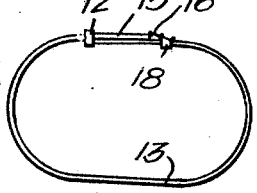
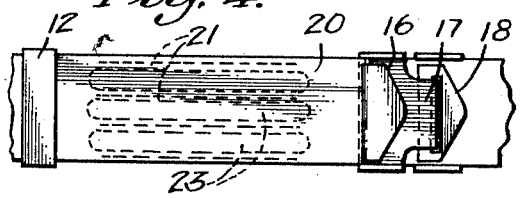
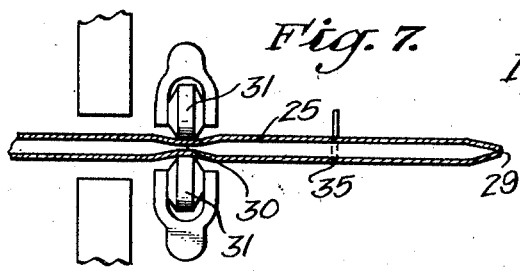
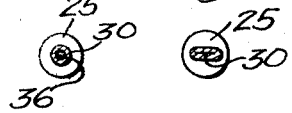
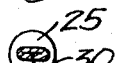
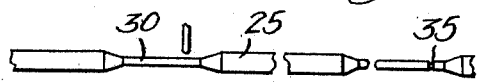
INVENTOR:
Jesse P. Whann March 26, 1929.  J. P. WHANN  1,707,182

LIFE SAVING DEVICE

Filed Jan. 15, 1925   2 Sheets-Sheet 2

INVENTOR:
Jesse P. Whann

Patented Mar. 26, 1929.

1,707,182

UNITED STATES PATENT OFFICE.

JESSE P. WHANN, OF LOS ANGELES, CALIFORNIA.

LIFE-SAVING DEVICE.

Application filed January 15, 1925. Serial No. 2,510.

This invention relates to aquatic life saving devices and it closely relates to a device of this character having features which render it exceptionally useful to bathers, life guards, water voyagers, and others who are liable to the dangers of the water.

A great many persons are drowned each year, statistics showing that in the United States alone the number of persons drowned each day averages eight. Many of these persons are drowned due to exhaustion while in deep water. This exhaustion weakens them so that they are unable to reach safety or keep afloat until assistance arrives. Many bathers and even expert swimmers are drowned because of muscular contraction which is commonly known as "cramps." When possessed of this muscular contraction, especially in the abdomen or stomach, it is utterly impossible to keep afloat as the bather is doubled up and substantially paralyzed. A large percentage of these drownings is caused by persons being caught by riptide or undertow while in surf bathing in the ocean.

It is very evident that there is at the present time no device which may be worn or carried by a bather, and not interfering with his activities, which is capable of being instantaneously operated to provide buoyancy sufficient to maintain him on the surface of the water when any of the above circumstances occur.

A device suitable for this use should have certain characteristics, the most important are enumerated as follows: In the first place, the device should be of such a design that under usual circumstances it will not in any way interfere with the activities of the user or wearer. It should be compact in size, arranged for convenient disposal on the wearer and should be light in weight. In the second place, the device should be so designed that it will not detract from the appearance of the wearer. This feature is important as many people are very particular about their appearance in a bathing suit, especially those of the younger set.

It is also an important consideration that the device be easy to operate to produce a buoyant condition. It should be quick in action and require only an extreme minimum of energy to operate it. A drowning person is naturally nervous and frustrated and any easiness and quickness as to operation is an appreciable asset to a device of this character. It is utterly preposterous to attempt to manually blow up a bag as is demanded by some patented devices; these devices, however, not being in use because of the impracticableness in this respect.

It is most important that a device for this purpose be reliable; that is, when a person ventures in to water with a device of this character, it should be absolutely certain that the device will function properly so that a person wearing the device will not be caught in dangerous circumstances, trusting in the device and then having the device fail him. It is evident, then, that reliability is of pronounced importance, the other mentioned requisites, however, are also very important to the success of a device of this character.

It is an object of this invention to provide a life saving device having the above mentioned characteristics which renders it suitable for the previously mentioned uses. The device consists of an air tight bag or a member providing a closed chamber; and self contained means for inflating this bag. The bag may be made from any suitable material impervious to gas and may either be elastic or non-elastic as desired. Also the bag may have various forms or embodiments to suit the demand of the occasion. The bag is arranged to have two positions;—deflated and inflated. When the bag is deflated it may be compactly folded so as not to interfere with the user's proclivities. When inflated, the bag serves as a buoy and is capable of supporting the individual using the device. The inflating means is preferably in the form of what may be termed a cartridge or capsule. This cartridge or casule comprises preferably a metal shell and a fluid or gas which may be contained in said shell under compression. This cartridge or a plurality of such cartridges are arranged inside said bag or in direct connection therewith. When the fluid is released from the shell it expands into a fixed gas—a gas which will not deteriorate—filling the bag and converting it into a buoy or life saver.

It is also an object of this invention to provide an inflating means or cartridge which is exceedingly easy to operate and which may be operated with an expenditure of an appreciably small amount of energy. This feature cannot be accentuated or emphasized too strenuously. It may be said that the entire value of the device is contained in its simplicity of operation and its small requirement of energy for operation. To explain this point we might say that a person drowning is terrorized and has very small control over his muscles; that is to say, his muscular activity is not to a great extent under his control altho he is struggling with no avail. This statement is acknowledged as a fact in most cases. Then it will be admitted a device which demands any process of that or reflection will probably be beyond a victim's reach and will be entirely impractical for this use as a life saver. This object of the invention is embodied in a novel type of cartridge which may be considered as comprising two sections or portions. These portions normally rest in certain relationship with respect to each other, preferably in axial alignment, altho this is not essential. The cartridge is so arranged that by changing the relationship or rather the angular relationship between the two portions the fluid may be released therefrom. The cartridge may be made in any of various forms. For instance, the shell may be made to be in one member which is arranged in two portions and which may be broken or ruptured in a manner to allow the fluid to escape when the portions are bent into angular relationship. Or the shell may be made in two separate members, one or both being filled with fluid. The changing of the angular relationship of the two members may effect a release of the fluid by opening a valve, puncturing a closure member, displacing a gasket or in any other obvious manner. The cartridge may be operated in various ways. A portion may be grasped in each hand and swung into a devious relationship, may be suitably operated in one hand, i. e. engaged near each end by the index and second fingers and at the center by the thumb, only on the opposite side, and a pressure applied thereto, or one portion may be retained in one hand and the other portion pressed against the body.

I am cognizant of the fact that certain devices have been patented which were evidently invented to meet this long felt need; but I am convinced that none of these devices are practical or supply what is demanded thereof. These devices if of any value would be on the market, but are not. Devices have been patented which employ chemicals for producing the inflating gas. Carbide arranged to be mixed with water has been used in this capacity. However, these devices are bulky in size and cannot be compacted properly for this particular use; they are very mussy and must be cleaned after actuation; the chemicals tend to eat away the bag; and the gas produced in this manner is subject to deterioration and the reliability of these devices is for this reason reduced.

Other objects, advantages and the especial uses of my invention will be made evident in the following description.

Referring to the drawings which are solely for illustrative purposes, and in which I show my invention embodied in the form of a life belt, Fig. 1 is a view showing the general construction of a life belt having the essentials of my invention.

Fig. 2 is an enlarged fragmentary view showing a novel form of buckle construction provided by my invention.

Fig. 3 is a view similar to Fig. 2 but showing the buckle in extended position.

Fig. 4 is a fragmentary view taken substantially as indicated by the arrow 4 of Fig. 2, this view showing clearly the buckle construction and cartridge compartments of the invention.

Figs. 5 and 6 are cross-sectional views illustrating two manners of folding the tubular bag into the form of a belt.

Figs. 7, 8 and 9 are views illustrating a form of cartridge of my invention which is suitable for use with low pressure gases, these views depicting also the method of making this form of cartridge.

Fig. 10 illustrates another form of low pressure cartridge.

Figure 11:
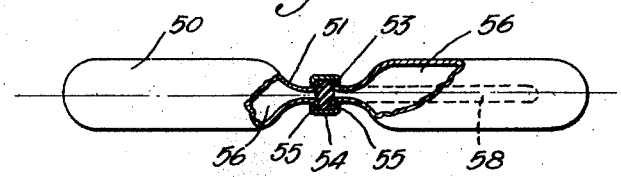
Fig. 11 illustrates a form of two-piece cartridge suitable for high gas pressure use.

With particular reference to Figs. 1 to 6 of the drawings, I supply a bag or casing in the form of a belt 11, this belt being made from any suitable material which is impervious to gas. Secured to one end 13 of the belt 11 is a loop 12, which may be made from metal. The opposite end 15 of the belt 11 extends thru the loop 12 and has a clamp 16 fastened at the extreme end 15, this clamp 16 providing a hook 17. The hook 17 is adapted for engagement with a hooking member 18 which is attached to the belt 11 near the end 13. The clamp 16 and the member 18 are adapted to serve as means for closing the ends of the belt 11 so as to provide an air tight chamber therein. In the portion 20 of the belt 11, which portion being adjacent to the end 15, I form compartments 21 which are arranged to receive cartridges 23 for inflating the belt 11. To place the cartridges in the compartments, the clamp 16 is removed and they are inserted thru the end 15 of the belt.

In Figs. 7, 8 and 9, I show one form of cartridge. This character of cartridge is made from a tube 25 which is preferably of a ductile nature, such as a lead, tin, zinc or an aluminum tube. In making the cartridges, one end 29 of the tube 25 is sealed and the tube is filled in a suitable manner from the other end thereof (not shown) with a compressed gas. The tube 25 is then placed in a rolling machine and a portion 30 thereof is constricted by suitable rollers 31. During the time that the rollers 31 are fed inwardly to constrict the portion 30, a scoring tool 33 is fed in to the periphery of the tube 25 to form a groove 35 therein. The grooving of the tube in this manner reduces the thickness of the wall of the tubes and renders it easily broken. When the tube 25 is constricted at 30 so that it is substantially closed as in Fig. 8, the rollers 31 are receded and the tube moved outwardly so that the end portion may be pinched off as shown in Fig. 9. This pinching operation seals the end of the tube and provides a cartridge ready for use. If it is thought desirable the ends may be subsequently soldered. To eliminate any possibility of leakage, the tube may be coated with a cementitious substance on the inner face as at 36 in Fig. 8. This will accomplish the closing of the pores of the tube and prevent leakage. It will also serve as a sealing gasket for the pinched portion 30 of the tube. The type of cartridge shown in Fig. 10 resembles the first type of cartridge except that the constricted portion is quite long and has the scoring made thereon. Both of these types of cartridges are made from a ductile and fairly soft material and are well suited for use in combination with a low pressure gas such as ethyl chloride or any gas which becomes a liquid at a substantially low pressure.

In Fig. 11 of the drawing, I show a cartridge which is intended for use with a high pressure gas such as ammonia carbon dioxide. This form of cartridge has a pair of bottle shaped members 50 which are arranged with the mouths 51 thereof in adjacency. These bottles 50 are made from a strong material such as steel and will resist considerable gas pressure. The mouths 51 are retained in gas tight relationship with the opposite faces of a gasket 53 by a sleeve 54 which has engagement with the lips 55 of the bottles 50. When the gas tight relationships between the mouths 51 and the gasket 53 are broken, a compressed gas contained in the chambers 56 of the bottles 50 is released therefrom. The releasing of the gas is accomplished by swinging the bottles relatively to each other to break the gas tight seals which retains the gas in the chambers 56. It is not necessary that both chambers be filled with a compressed gas. It is evident that were one of the bottles replaced by an arm 58, the arm 58 would merely serve as a means for releasing the gas. Likewise one of the bottles 50 may serve as a means for releasing the gas contained by the other.

Figure 12:
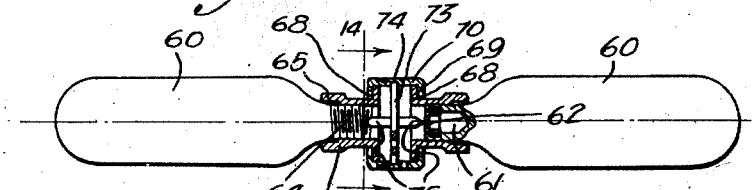
Figs. 12, 13 and 14 are views disclosing a two piece cartridge suitable for high pressure use which incorporates a novel form of releasing means.
Figure 13:
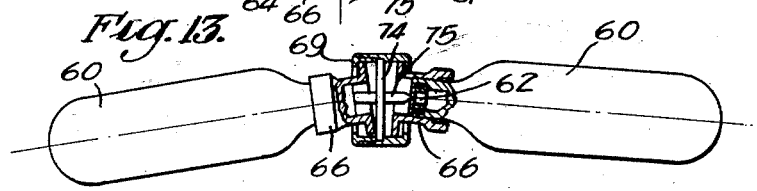
Figure 14:

In Figs. 12, 13 and 14, I illustrate a form of high pressure tube which includes a novel releasing means. This type of cartridge comprises a pair of gas containers 60 which are bottle shaped as shown. The mouth 61 of each container 60 is sealed by a closure member 62 which is retained in place by forming an inwardly directed lip, this lip engaging a gasket which in turn retains the closure in place. The neck of each of the containers is threaded as at 64 so that they may be screwed into collars 65 of container holders 66. A flange 68 extends from each of the collars 66, these flanges being engaged by lips 69 of a sleeve 70 for retaining the lips 69 within the tubular portion of the sleeve. A disc portion 73 of a puncturing element 74 is rigidly retained by the sleeve 70 so that the prongs 75 thereof extend to a point adjacent to the closure members 62 of the containers 60. To release the gas from the containers 60 it is necessary to puncture the closure members 62. In Fig. 12 I show this cartridge in its normal position. The two containers 60 are in this position in axial alignment. To release the gas from the containers 60, the cartridges are swung from axial alignment as shown in Fig. 12 into non-axial alignment as shown in Fig. 13. In other words, the containers are moved into a different angular relationship. From Fig. 13 it is seen that this is effective in swinging the holders 66 inwardly relatively to the sleeve 70 and relatively to the puncturing element 74, the holders fulcruming at points on the peripheries of the flanges 68 as indicated at 70. This inward movement causes engagement between the prongs 75 and the closure members 62 causing a puncturing of the closure members 62 and a releasing of the gas contained in the containers 60.

Figure 15:
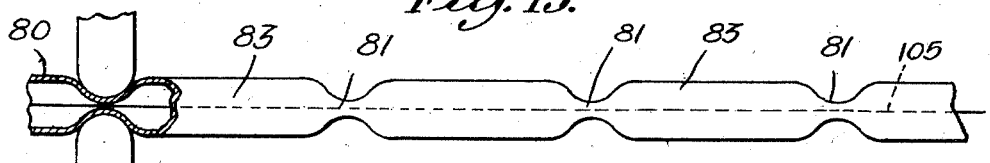
Figs. 15, 16 and 17 illustrate a one piece cartridge suitable for high pressure use, and the method of making same.
Figure 16:
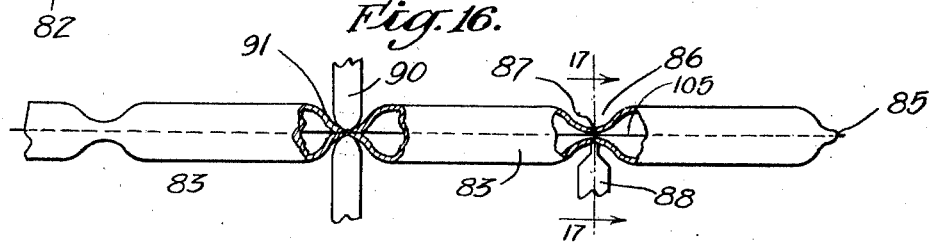
Figure 17:
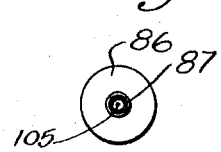

In Figs. 15, 16 and 17 a one piece design of cartridge and the method of its making is shown. This form of cartridge is made from a steel tube 80 which first has constricted portions 81 formed therein at equal places along its length, in a manner to divide the tube 80 in a number of portions 83. These constrictions 81 are conveniently made by rollers 82 which may be fed inwardly and rotated; or the tube may be rotated. It is thought best to rotate the rollers 82 around the tube 80 owing to the fact that the tube will generally be of quite a length and, therefore, inconvenient to rotate. One end of the tube 80 is closed as shown at 85 in Fig. 16, in a manner which will be elucidated shortly. The tube is then filled with a suitable compressed gas such as ammonia or carbon dioxide thru the other end of neck (not shown). The first neck 86 from the righthand end of the tube which neck being formed by constricting the tube 80 is scored or grooved as at 87. This scoring is conveniently accomplished by a revolving scoring tool 88. As shown clearly in Fig. 17, the scoring 87 renders the wall of the tube very thin at this point so that it may be readily broken. The next operation is to separate the two end portions 83 to form a cartridge. This separation is accomplished by feeding rollers 90 inward so as to engage the wall of the neck 91 in a manner to force the wall of the tube 80 into gas tight contact at this point and to separate the two end portions 83 from the rest of the tube, this being the same manner in which the end 85 of the tube was sealed. The rollers 90 serve to separate the tube and also to seal the separated ends at the same time. This process may be continued and cartridges very rapidly produced. The cartridge thus formed is in the shape of two portions 83 which are separated by a neck or constriction having a scoring 87 made thereat to render the cartridge easily broken. The compressed gas trapped in the cartridge is released by breaking the cartridge at the scoring 87. This is accomplished by rupturing the metal by swinging portions 83 in to divers angular relationship.

In commercial practice I may heat the tube 80 so that the necks 81 may be quickly made without danger of rupturing the shell. At 105 in Figs. 15, 16, and 17 I indicate a string which may be threaded thru the tube 80 after the necks 81 are formed. When the alternate necks 81 are rolled together the string is compressed at that point and serves as a gasket tightly sealing the ends of the cartridge. This string 105 may be made from any suitable gasket material such as rubber.

I have shown a variety of types of cartridges which may be employed as an inflating means for my invention but it will be seen that all the cartridges are possessed of the same principle of releasing the gas, i. e., the swinging of portions of the cartridge into a different angular relationship. I have endeavored to devise an efficient cartridge which will be simple to operate, and I find that cartridges made on this principle approach nearest to my desire.

Again referring to Figs. 1, 2, 3 and 4, the cartridges placed in the compartments may be any of the types just described. The belt when in collapsed position takes the form shown in Fig. 1, and the buckle takes the position shown in Fig. 2. The belt is worn over the bathing suit being positioned at the waistline. As many bathers now wear belts to improve their appearance, the wearing of my invention does not create a new custom and it is not necessary to educate people in this respect. The bag or belt portion is folded so that it has an appearance of the usual bathing suit belt. In Figs. 5 and 6, I illustrate two ways of folding the belt. In Fig. 5, the belt 11 is folded in the center and in Fig. 6 it is folded in thirds. The belt shown in Fig. 5 will expand to the tubular size as indicated by the dotted circle 100, whereas the belt shown in Fig. 6 will expand to the tubular size indicated at 101.

The operation of the belt is substantially as follows:

A bather wearing my belt has for any of the mentioned reasons such muscular contraction, undertow or exhaustion, use for a life preserver. He unhooks the hook 17 from the clamp 18 and the belt is extended into elongated position so that the loop 12 and the clamp 16 engage as in Fig. 3. One or more of the cartridges is then broken as explained to inflate the belt portion 11. It might be more desirable under some conditions to break a cartridge before unhooking the buckle. I believe, however, that the cartridges will be much more accessible after the buckle is unhooked. After the belt is extended it fits very loosely around the wearer and automatically moves into proper position under the arm pit when the bag inflates. The bag will assume tubular form as indicated at 100 or 101 in Fig. 5 or 6 according to the manner of folding, when it is inflated. By extending the circumference of the belt, I permit it to move up under the arm pits and I also compensate for the inflation of the bag. It is evident that the inside diameter reduces when the bag is inflated.

It is believed that 99 per cent of the drownings can be obviated by my invention. To illustrate this, a bather being exhausted can inflate the belt and be supported on the water until he becomes rested. Similarly a bather being obsessed with muscular contraction may inflate the belt and be supported until help arrives. In other words, there need be no drownings because of exhaustion or muscular contraction. A person caught in an undertow can inflate the belt and be raised to the surface of the water when he is released by the undertow. A great percentage of undertow drownings result from terrorization and not undertow; that is, the undertow does not really exist but is imaginary. As an explanation, the surf waves travel to the beach at considerable speed. A bather beyond the breakers becomes tired and makes for the shore. He progresses towards the shore at a fair travel but nothing near the speed at which the waves travel. The relativity between his travel and the travel of the waves makes him appear to move outwardly and not inwardly as he really does. He, because of this illusion, becomes panic stricken, expends all his energy in excess motion and exhausts himself.

The result is he is drowned not because of undertow but purely as a result of imagination. By the employment of my invention this catastrophe would be prevented as the bather would have confidence and would not be terrorized by his illusion.

The sport of swimming is not enjoyed by a certain multitude because of their fear of drowning. Consequently many people never learn to swim or even enter the water. My invention makes it possible to enter the water with confidence. My invention will revolutionize swimming and many more people may enjoy this very popular sport.

Life savers in making a rescue tow a buoy with them to the drowning person, this buoy having a rope attached thereto by which it is pulled to the shore. His progress is slow because of the impediment of the buoy and often the person sinks before he is reached. The victim is usually in a frantic condition and to get him ashore the life guard sometimes must knock him unconscious. My invention is of exceptional value to life guards. The guard in making a rescue wears my life belt and has a second belt in a pocket of his suit. He speedily swims to the victim, there being no interference of buoys or such. First the guard inflates the belt he is wearing so that he will not be sunk when clutched by the drowning person. Next he extends the other belt around the victim's waist and inflates it, this supporting the victim. He then pulls the drowning bather to shore fairly convenient not having to knock him unconscious. There are many other uses for my invention, too numerous to mention here.

Broadly stated the novelty of my invention resides in the improvision of a closed bag having a cartridge within said bag, which cartridge is adapted to be operated by gripping thru said bag.

From the foregoing description, the construction and various applications of my invention are clearly evident, it is to be understood, however, that various modifications or changes might be made without violating the scope and spirit of the invention.

I claim as my invention:

1. A cartridge for inflating a life-preserver, consisting of a tubular member having the ends thereof sealed so as to retain a gas producing material, and characterized by scoring permitting facile breakability at an intermediate portion so as to release said gas producing material.

2. A cartridge for inflating a life preserver, consisting of a tubular member having the ends thereof closed so as to retain a gas producing material, and characterized by breakability at an intermediate portion so as to release said gas producing material; said cartridge having a cementitious lining on the inner wall thereof.

3. A cartridge for inflating a life preserver of the character described, the combination of: a pair of containers having a compressed fluid therein; and means connecting said containers together for releasing said fluid from said containers.

4. A cartridge for inflating a life preserver of the character described, the combination of: a pair of containers having a compressed fluid therein; and means connecting said containers together for releasing said fluid from said containers, said means being arranged to release said fluid when said containers are moved into different angular relationship.

5. A cartridge for inflating a life-preserver consisting of two shell portions having gas producing material contained therein, in which said gas producing material is released from said shells by moving them into positions of different angular relationship.

6. A cartridge for inflating a life preserver, consisting of a tubular member having the end portions thereof of relatively large diameter with the center portion thereof reduced to relatively small diameter.

Signed at Los Angeles, in the county of Los Angeles, State of California, this 19th day of December, 1924.

JESSE P. WHANN.